US009939904B2

(12) United States Patent
Ullrich et al.

(10) Patent No.: US 9,939,904 B2
(45) Date of Patent: Apr. 10, 2018

(54) SYSTEMS AND METHODS FOR PRESSURE-BASED HAPTIC EFFECTS

(71) Applicant: Immersion Corporation, San Jose, CA (US)

(72) Inventors: Christopher J. Ullrich, Ventura, CA (US); Amaya Weddle, San Jose, CA (US); Hua Yu, San Jose, CA (US); David Birnbaum, Oakland, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/462,248

(22) Filed: Mar. 17, 2017

(65) Prior Publication Data

US 2017/0192510 A1 Jul. 6, 2017

Related U.S. Application Data

(63) Continuation of application No. 14/302,147, filed on Jun. 11, 2014, now Pat. No. 9,632,581.
(Continued)

(51) Int. Cl.
*G06F 3/01* (2006.01)
*G06F 3/0484* (2013.01)
(Continued)

(52) U.S. Cl.
CPC ............ *G06F 3/016* (2013.01); *G06F 3/0488* (2013.01); *G06F 3/04845* (2013.01);
(Continued)

(58) Field of Classification Search
CPC .... G06F 3/016; G06F 3/04845; G06F 3/0488; G06F 3/04883; G06F 2203/014; G06F 2203/04105
See application file for complete search history.

(56) References Cited

U.S. PATENT DOCUMENTS 5,784,052 A 7/1998 Keyson
7,336,260 B2 2/2008 Martin et al.
(Continued)

FOREIGN PATENT DOCUMENTS

CN 102236463 A 11/2011
CN 102349038 A 2/2012
(Continued)

OTHER PUBLICATIONS

U.S. Patent Office U.S. Appl. No. 14/663,406, Non-Final Office Action dated Nov. 4, 2016.
(Continued)

*Primary Examiner* — Jennifer Mehmood
*Assistant Examiner* — Sardis F Azongha
(74) *Attorney, Agent, or Firm* — Kilpatrick Townsend & Stockton LLP

(57) ABSTRACT

One illustrative system disclosed herein includes a sensor configured to detect a user interaction with a touch surface and transmit a sensor signal including data associated with a pressure of the user interaction. The illustrative system also includes a processor in communication with the sensor, the processor configured to: receive the sensor signal; determine, based on the sensor signal, a pressure level; determine a user interface level based at least in part on the pressure level; perform a function associated with the user interface level and the user interaction; determine a haptic effect based at least in part on the user interface level and the user interaction; generate a haptic signal based at least in part on the haptic effect; and transmit the haptic signal. The illustrative system further includes a haptic output device in configured to receive the haptic signal and output the haptic effect.

20 Claims, 7 Drawing Sheets

Related U.S. Application Data

(60) Provisional application No. 61/833,626, filed on Jun. 11, 2013.

(51) Int. Cl.
*G06F 3/0488* (2013.01)
*G06F 3/041* (2006.01)

(52) U.S. Cl.
CPC ........ *G06F 3/041* (2013.01); *G06F 2203/014* (2013.01); *G06F 2203/04105* (2013.01)

(56) References Cited

U.S. PATENT DOCUMENTS

| | | | |
|---|---|---|---|
| 7,535,454 | B2 | 5/2009 | Jasso et al. |
| 7,952,566 | B2 | 5/2011 | Poupyrev et al. |
| 8,164,573 | B2 | 4/2012 | DaCosta et al. |
| 8,328,638 | B2 | 12/2012 | Thorner |
| 8,378,798 | B2 * | 2/2013 | Bells .................. G06F 3/016 340/407.1 |
| 8,547,244 | B2 | 10/2013 | Duarte et al. |
| 8,576,171 | B2 * | 11/2013 | Grant .................. G06F 3/016 345/163 |
| 8,754,854 | B1 | 6/2014 | Hamburgen et al. |
| 9,213,449 | B2 * | 12/2015 | Bong .................. G06F 3/044 |
| 9,405,367 | B2 * | 8/2016 | Jung .................. G06F 3/016 |
| 9,417,754 | B2 * | 8/2016 | Smith .................. G06F 3/048 |
| 9,454,230 | B2 | 9/2016 | Matsuki |
| 9,582,178 | B2 | 2/2017 | Grant et al. |
| 2005/0110769 | A1 | 5/2005 | DaCosta et al. |
| 2005/0209741 | A1 | 9/2005 | Cunningham |
| 2007/0229455 | A1 | 10/2007 | Martin et al. |
| 2009/0058828 | A1 | 3/2009 | Jiang et al. |
| 2009/0140989 | A1 | 6/2009 | Ahlgren |
| 2010/0017710 | A1 | 1/2010 | Kim et al. |
| 2010/0231367 | A1 | 9/2010 | Cruz-Hernandez et al. |
| 2010/0231541 | A1 | 9/2010 | Cruz-Hernandez et al. |
| 2010/0231550 | A1 | 9/2010 | Cruz-Hernandez et al. |
| 2011/0018695 | A1 | 1/2011 | Bells et al. |
| 2011/0227872 | A1 * | 9/2011 | Huska .................. G06F 3/016 345/174 |
| 2011/0248930 | A1 | 10/2011 | Kwok et al. |
| 2011/0261021 | A1 | 10/2011 | Modarres et al. |
| 2011/0267294 | A1 | 11/2011 | Kildal |
| 2012/0146955 | A1 | 6/2012 | Martin-Cocher et al. |
| 2012/0147052 | A1 | 6/2012 | Homma et al. |
| 2012/0315882 | A1 | 12/2012 | Chang et al. |
| 2013/0113715 | A1 | 5/2013 | Grant et al. |
| 2013/0127735 | A1 | 5/2013 | Motoyama |
| 2013/0172052 | A1 | 7/2013 | Bengtsson et al. |
| 2013/0321317 | A1 | 12/2013 | Hirukawa |
| 2014/0049483 | A1 | 2/2014 | Kim |
| 2014/0139450 | A1 | 5/2014 | Levesque et al. |
| 2014/0139471 | A1 | 5/2014 | Matsuki |
| 2014/0362014 | A1 | 12/2014 | Ullrich et al. |

FOREIGN PATENT DOCUMENTS

| | | |
|---|---|---|
| CN | 102609088 A | 7/2012 |
| CN | 103092406 A | 5/2013 |
| EP | 0935191 A2 | 8/1999 |
| JP | 2008-033739 A | 2/2008 |
| JP | 2011-129047 A | 6/2011 |
| JP | 2013-070303 A | 4/2013 |
| WO | 2013/8104919 A1 | 7/2013 |

OTHER PUBLICATIONS

U.S. Patent Office U.S. Appl. No. 14/663,406, Final Office Action dated Mar. 30, 2017.
U.S. Patent Office U.S. Appl. No. 14/663,406, Request for Continued Examination filed Jun. 9, 2017.
U.S. Patent Office U.S. Appl. No. 14/663,406, Non-Final Office Action dated Jul. 17, 2017.
Buxton et al., Issues and techniques in touch-sensitive tablet input. In Proc. SIGGRAPH 1985, vol. 19, pp. 215-224.
Cechanowicz et al., Augmenting the mouse with pressure sensitive input. In Proceedings of the SIGCHI Conference on Human Factors in Computing Systems—CHI 2007.
Clarkson et al., Exploring Continuous Pressure Input for Mobile Phones. Georgia Institute of Technology, web page available at https://smartech.gatech.edu/handle/1853/13138, as available via the Internet, submitted for review to UIST 2005.
Heo et al., ForceDrag; Using pressure as a touch input modifier, In Proceedings of the 24th Australian Computer-Human Interaction Conference on—OZCHI 2012, pp. 204-207.
Heo et al., Force Gestures: Augmented touch screen gestures using normal and tangential force. In in Proceedings of the 2011 Annual Conference Extended Abstracts on Human Factors in Computing Systems—CHI EA'11, pp. 1909-1914.
Mandalapu et al., Exploring pressure as an alternative to multi-touch based interaction. In Proceedings of the 3rd International Conference on Human Computer Interaction—IndiaHCI 2011.
Miyaki et al., GraspZoom: Zooming and scrolling control model for single-handed mobile interaction, In Proceedings of the 11th International Conference on Human-Computer Interaction with Mobile Devices and Services—MobileHCI 2009.
Mackenzie et al., A Comparison of Three Selection Techniques for Touchpads, CHI '98 Proceedings of the SIGCHI Conference on Human Factors in Computing Systems, pp. 336-343, 1998.
Raisamo, R., Evaluating different touched-based interaction techniques in a public information kiosk. In Conference of the CHI Special Interest Group of the Ergonomics Society of Australia, pp. 169-171, 1999.
Ramos et al., Fluid interaction techniques for the control and annotation of digital video. In Proceedings of the 16th Annual ACM Symposium on User Interface Software and Technology—UIST 2003, vol. 5, pp. 105-114.
Ramos et al., Pressure widgets. In Proceedings of the 2004 Conference on Human Factors in Computing Systems—CHI 2004, vol. 6, No. 1, pp. 487-494.
Ramos et al., Pressure marks. In Proceedings of the SIGCHI Conference on Human Factors in Computing Systems—CHI 2007, pp. 1375-1384.
Rekimoto et al., PreSenseII: Bi-direcetional touch and pressure sensing interactions with tactile feedback. In CHI 2006 Extended Abstracts on Human Factors in Computing Systems—CHI EA '06.
Shi et al., PressureFish; A method to improve control of discrete pressure-based input, In Proceeding of the Twenty-Sixth Annual CHI Conference on Human Factors in Computing Systems—CHI 2008, pp. 1295-1298.
Stewart et al., Characteristics of pressure-based input for mobile devices. In Proceedings of the 28th International Conference on Human Factors in Computing Systems—CHI 2010.
Voelker et al., An evaluation of state switching methods for indirect touch systems, In Proceedings of the SIGCHI Conference on Human Factors in Computing Systems—CHI 2013, pp. 745-754.
Patent Cooperation Treaty, International Search Report and Written Opinion, International Application No. PCT/US2015/021405 dated Jun. 3, 2015.
European Patent Office Application No. 16191529.3, Communication Pursuant to Article 94(3) EPC dated Nov. 20, 2017, 7 pages.
State Intellectual Property Office of the Peoples Republic of China Application No. 201480033405.3, Office Action dated Jan. 4, 2018, 7 pages.
Japanese Patent Office Application No. 2016-519620, Office Action dated Jan. 9, 2018, 4 pages.

* cited by examiner

SYSTEMS AND METHODS FOR PRESSURE-BASED HAPTIC EFFECTS

REFERENCE TO RELATED APPLICATION

This application is a continuation of co-pending U.S. patent application Ser. No. 14/302,147, filed Jun. 11, 2014, entitled "Systems and Methods for Pressure-Based Haptic Effects," which claims priority to U.S. Provisional Patent Application No. 61/833,626, entitled "Rendering of Haptic Effects Based on Discrete Pressure Values," filed Jun. 11, 2013, the entirety of all of which are hereby incorporated by reference.

FIELD OF THE INVENTION

The present invention relates to the field of user interface devices. More specifically, the present invention relates to pressure-based haptic effects.

BACKGROUND

As computer-based systems become more prevalent, the quality of the interfaces through which humans interact with these systems is becoming increasingly important. One interface that is of growing popularity due to its intuitive and interactive nature is the touchscreen display. Through a touchscreen display, a user can perform a variety of tasks by contacting a region of the touchscreen with the user's finger. In order to create a more intuitive and enhanced user experience, designers often leverage user experience with physical interactions. This is generally done by reproducing some aspects of interactions with the physical world through visual, audio, and/or haptic feedback. Haptic feedback often takes the form of a mechanical vibration. There is a need for additional systems and methods to generate haptic feedback.

SUMMARY

Embodiments of the present disclosure comprise computing devices featuring pressure-based haptic effects. In one embodiment, a system of the present disclosure may comprise a sensor configured to detect a user interaction with a touch surface and transmit a sensor signal comprising data associated with a pressure of the user interaction. The system may also comprise a processor in communication with the sensor, the processor configured to: receive the sensor signal; determine, based on the sensor signal, a pressure level; and determine a user interface level based at least in part on the pressure level. The processor may also be configured to perform a function associated with the user interface level and the user interaction; determine a haptic effect based at least in part on the user interface level and the user interaction; generate a haptic signal based at least in part on the haptic effect; and transmit the haptic signal. The system may further comprise a haptic output device in communication with the processor, the haptic output device configured to receive the haptic signal and output the haptic effect.

In another embodiment, a method of the present disclosure may comprise: receiving a sensor signal from a sensor, wherein the sensor signal comprises data associated with a pressure of a user interaction with a touch surface. The method may also comprise determining, based on the sensor signal, a pressure level; and determining a user interface level based at least in part on the pressure level. The method may further comprise performing a function associated with the user interface level and the user interaction; determining a haptic effect based at least in part on the user interface level and the user interaction; generating a haptic signal based at least in part on the haptic effect; and transmitting the haptic signal to a haptic output device, wherein the haptic output device is configured to receive the haptic signal and output the haptic effect. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
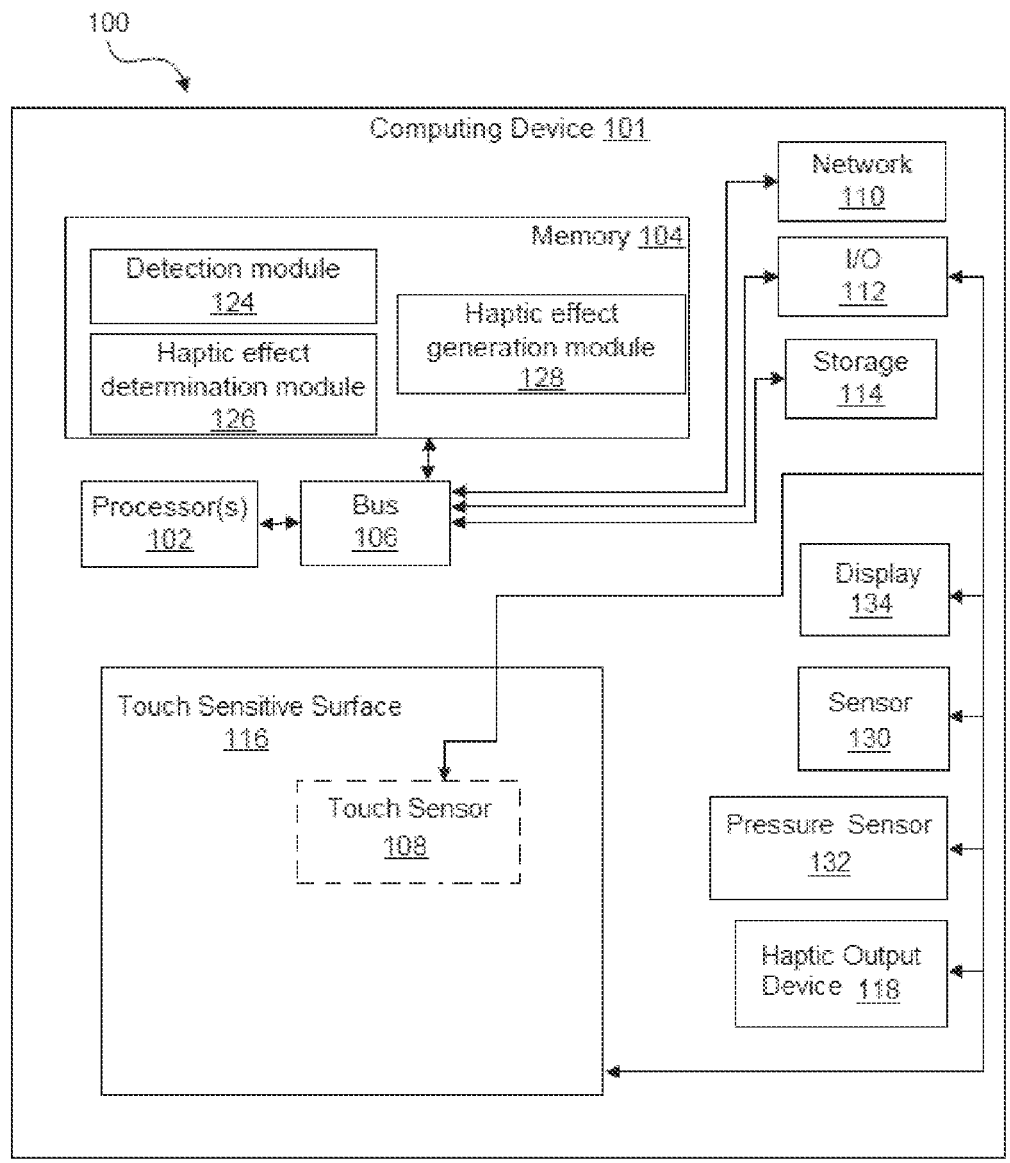
FIG. 1 is a block diagram showing a system for pressure-based haptic effects according to one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Pressure-Based Haptic Effects

One illustrative embodiment of the present disclosure comprises a computing device, such as a smart phone, tablet, or e-reader. The computing device comprises a touch-screen display, a memory, a camera, and a processor in communication with each of these elements.

In the illustrative embodiment, the touch-screen display is configured to output a user interface. For example, the touch-screen display may output a user interface associated with a camera application. A user may interact with the camera application, for example, to take photographs or videos. The user interface comprises multiple user interface levels with which a user may interact. Each user interface level may be configured to cause the computing device to perform one or more functions. For example, a first user interface level may be configured to allow a user to focus on an object (e.g., a person, animal, tree, automobile, or building) within view of the camera. A second user interface level may be configured to take a photograph of the object.

In the illustrative embodiment, the user may interact with (or activate) the different user interface levels by applying an amount of pressure associated with that level to the touch-screen display. The computing device is configured to detect and categorize the amount of pressure into one of a plurality of pressure levels (i.e., a range of pressures falling between two pressure thresholds). Each pressure level may be associated with a user interface level. For example, no pressure (e.g., the user is exerting a small amount of pressure or no pressure on the touch surface) may not be associated with a user interface level. Soft pressure (e.g., the user is contacting the touch surface with low pressure) may be associated with the first user interface level. Thus, the user may be able to focus the camera on the object by applying soft pressure to the touch-screen display. Firm pressure (e.g., the user is contacting the touch surface with more pressure than the soft pressure level) may be associated with the second user interface level. Thus, the user may be able to take a photo of the object by applying firm pressure to the touch-screen display.

In the illustrative embodiment, the computing device is also in communication with a haptic output device. The haptic output device is configured to receive a signal from the computing device and output a haptic effect perceivable by a user.

In the illustrative embodiment, the computing device is configured to determine, based at least in part on the user interface level, a haptic effect to output. For example, in the illustrative embodiment, if the computing device determines that the user is exerting a small amount of pressure or no pressure on the touch-screen display, the computing device may determine no haptic effect. In the illustrative embodiment, if the computing device determines that the user is exerting a soft pressure on the touch-screen display, the computing device outputs a haptic effect (e.g., a haptic effect configured to simulate the movement of a camera lens). Further, in the illustrative embodiment, if the computing device determines that the user is exerting a firm pressure on the touch-screen display, the computing device outputs another haptic effect (e.g., a haptic effect configured to simulate the shutter of a camera taking a photo and film advancing to the next frame). Thus, the user may be able to focus the camera on an object and take a photo of the object without having to move the user's finger from a single location on the touch-screen display. This may make interactions with the camera application easier for the user.

In some embodiments, the haptic effects associated with two or more user interface levels may be the same. For example, in some embodiments, the haptic effects associated with the first user interface level and the second user interface level may be the same (e.g., a vibration). In other embodiments, the haptic effects associated with two or more user interface levels may be different. For example, in some embodiments, the haptic effect associated with the first user interface level may comprise a vibration and the haptic effect associated with the second user interface level may comprise a second vibration that is clearly distinguishable from the first vibration, or a change in a perceivable coefficient of friction.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Pressure-Based Haptic Effects

FIG. 1 is a block diagram showing a system 100 for pressure-based haptic effects according to one embodiment. As shown in FIG. 1 system 100 comprises a computing device 101. Computing device 101 may comprise, for example, a mobile phone, tablet, e-reader, laptop computer, desktop computer, car computer system, medical device, game console, game controller, or portable gaming device. Further, in some embodiments, the computing device 101 may comprise a multifunction controller, for example, a controller for use in a kiosk, automobile, alarm system, thermostat, or other type of computing device. While system 100 is shown as a single device in FIG. 1, in other embodiments, the system 100 may comprise multiple devices, such as a game console and one or more game controllers.

The computing device 101 comprises a processor 102 in communication with other hardware via bus 106. A memory 104, which can comprise any suitable tangible (and non-transitory) computer-readable medium such as RAM, ROM, EEPROM, or the like, embodies program components that configure operation of the computing device 101. In the embodiment shown, computing device 101 further includes one or more network interface devices 110, input/output (I/O) components 112, and storage 114.

Network interface device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate wired or wireless connection to devices such as one or more displays 134, game controllers, keyboards, mice, joysticks, cameras, buttons, speakers, microphones, and/or other hardware used to input data or output data. Storage 114 represents non-volatile storage such as magnetic, optical, or other storage media included in computing device 101 or coupled to processor 102.

System 100 further includes a touch sensitive surface 116 which, in this example, is integrated into computing device 101. Touch sensitive surface 116 represents any surface that is configured to sense tactile input of a user. One or more touch sensors 108 are configured to detect a touch in a touch area when an object contacts a touch sensitive surface 116 and provide appropriate data for use by processor 102. Any suitable number, type, or arrangement of sensors can be used. For example, resistive and/or capacitive sensors may be embedded in touch sensitive surface 116 and used to determine the location of a touch and other information, such as pressure, speed, and/or direction. As another example, optical sensors with a view of the touch sensitive surface 116 may be used to determine the touch position.

In other embodiments, the touch sensor 108 may comprise a LED detector. For example, in one embodiment, touch sensitive surface 116 may comprise a LED finger detector mounted on the side of a display 134. In some embodiments, the processor 102 is in communication with a single touch sensor 108, in other embodiments, the processor 102 is in communication with a plurality of touch sensors 108, for example, a first touch screen and a second touch screen. The touch sensor 108 is configured to detect user interaction, and based on the user interaction, transmit signals to processor 102. In some embodiments, touch sensor 108 may be configured to detect multiple aspects of the user interaction. For example, touch sensor 108 may detect the speed and pressure of a user interaction, and incorporate this information into the interface signal.

Touch sensitive surface 116 may or may not comprise (or otherwise correspond to) the display 134, depending on the particular configuration of the system 100. Some embodiments include a touch enabled display that combines a touch sensitive surface 116 and a display 134 of the device. The touch sensitive surface 116 may correspond to the display 134 exterior or one or more layers of material above components shown on the display 134.

Figure 2:
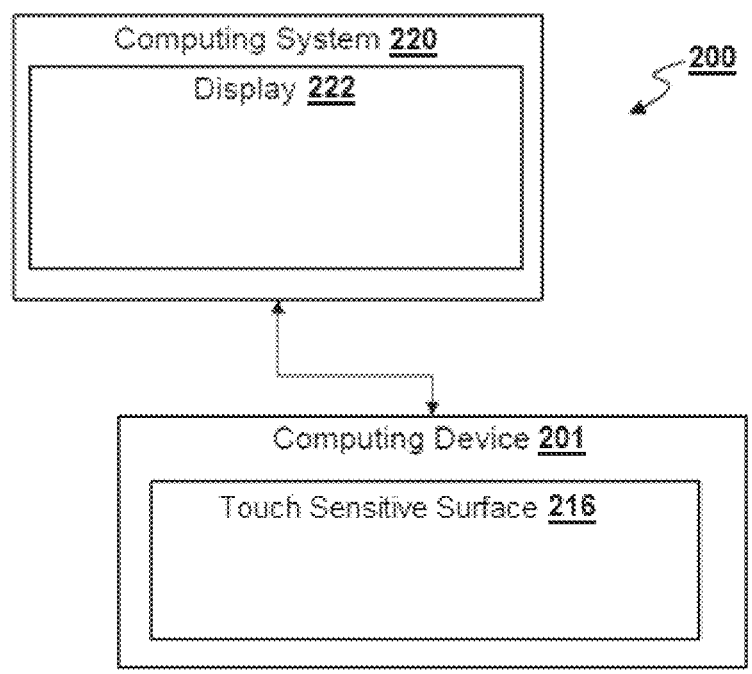
FIG. 2 is another block diagram showing a system for pressure-based haptic effects.

In some embodiments, the computing device 101 comprises a touch sensitive surface 116 that may be mapped to a graphical user interface provided in a display 134 included in system 100 and interfaced to computing device 101. For example, as shown in FIG. 2, computing device 201 comprises a touch sensitive surface 216, which may be mapped to a graphical user interface provided in a display 222 included in computing system 220. Computing system 220 is communicatively coupled to computing device 201. The computing device 201 may comprise, for example, a mouse, trackpad, or other device. The computing system 220 may comprise, for example, a laptop computer, desktop computer, set-top box (e.g., DVD player, DVR, cable television box), or another computing system. Whether integrated with a display 222 or otherwise, the depiction of planar touch sensitive surfaces 216 in the examples herein is not meant to be limiting. Other embodiments may comprise curved or irregular touch sensitive surfaces 216.

Returning to FIG. 1, the system 100 further includes a pressure sensor 132. The pressure sensor 132 is configured to detect an amount of pressure exerted by a user against a surface associated with the computing device 101 (e.g., touch sensitive surface 116). The pressure sensor 132 is further configured to transmit sensor signals to the processor 102. The pressure sensor 132 may comprise, for example, a capacitive sensor, a strain gauge, a frustrated total internal reflection sensor, or a FSR. In some embodiments, the pressure sensor 132 may be configured to determine the surface area of a contact between a user and a surface associated with the computing device 101. In some embodiments, the touch sensitive surface 116 or the touch sensor 108 may comprise the pressure sensor 132.

The system 100 comprises one or more additional sensors 130. In some embodiments, the sensor 130 may comprise, for example, a camera, a gyroscope, an accelerometer, a global positioning system (GPS) unit, a temperature sensor, a strain gauge, a force sensor, a range sensor, or a depth sensor. In some embodiments, the gyroscope, accelerometer, and GPS unit may detect an orientation, acceleration, and location of the computing device 101, respectively. In some embodiments, the camera, range sensor, and/or depth sensor may detect a distance between computing device 101 and an external object (e.g., a user's hand, head, arm, foot, or leg; another person; an automobile; a tree; a building; or a piece of furniture). Although the embodiment shown in FIG. 1 depicts the sensor 130 internal to computing device 101, in some embodiments, sensor 130 may be external to computing device 101. For example, in some embodiments, the one or more sensors 130 may be associated with a wearable device (e.g., a ring, bracelet, sleeve, collar, hat, shirt, glove, article of clothing, or glasses) and/or coupled to a user's body. In some embodiments, the processor 102 may be in communication with a single sensor 130 and, in other embodiments, the processor 102 may be in communication with a plurality of sensors 130, for example, a gyroscope and an accelerometer. The sensor 130 is configured to transmit a sensor signal to the processor 102.

System 100 further includes haptic output device 118 in communication with processor 102. Haptic output device 118 is configured to output a haptic effect in response to a haptic signal. In some embodiments, the haptic effect may comprise, for example, one or more of a vibration, a change in a perceived coefficient of friction, a simulated texture, a change in temperature, a stroking sensation, an electrotactile effect, or a surface deformation.

In the embodiment shown in FIG. 1, the haptic output device 118 is in communication with processor 102 and internal to computing device 101. In other embodiments, the haptic output device 118 may be remote from computing device 101, but communicatively coupled to processor 102. For example, haptic output device 118 may be external to and in communication with computing device 101 via wired interfaces such as Ethernet, USB, IEEE 1394, and/or wireless interfaces such as IEEE 802.11, Bluetooth, or radio interfaces. In some embodiments, the haptic output device 118 may be coupled to a wearable device that may be remote from the computing device 101. In some embodiments, the wearable device may comprise a shoe, a sleeve, a jacket, glasses, a glove, a ring, a watch, a wristband, a bracelet, an article of clothing, a hat, a headband, and/or jewelry. In such an embodiment, the wearable device may be associated with a part of a user's body, for example, a user's finger, arm, hand, foot, leg, head, or other body part.

In some embodiments, the haptic output device 118 may be configured to output a haptic effect comprising a vibration. The haptic output device 118 may comprise, for example, one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, haptic output device 118 may be configured to output a haptic effect comprising a change in a perceived coefficient of friction on a surface associated with computing device 101 (e.g., the touch sensitive surface 116). In one embodiment, the haptic output device 118 comprises an ultrasonic actuator. The ultrasonic actuator may vibrate at an ultrasonic frequency, for example 20 kHz, increasing or reducing the perceived coefficient on a surface associated with the computing device 101 (e.g., touch sensitive surface 116). In some embodiments, the ultrasonic actuator may comprise a piezoelectric material.

In other embodiments, haptic output device 118 may use electrostatic attraction, for example by use of an electrostatic actuator, to output a haptic effect. In such an embodiment, the haptic effect may comprise a simulated texture, a simulated vibration, a stroking sensation, or a perceived change in a coefficient of friction on a surface associated with computing device 101 (e.g., touch sensitive surface 116). In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger, head, foot, arm, shoulder, leg, or other body part, or a stylus) near or touching the haptic output device 118. In some embodiments, varying the levels of attraction between the object and the conducting layer can vary the haptic effect perceived by a user interacting with the computing device 101.

In some embodiments, the haptic output device 118 may comprise a deformation device. The deformation device may be configured to output a haptic effect by deforming a surface associated with the haptic output device 118 (e.g., a housing of the computing device 101 or the touch sensitive surface 116). In some embodiments, the haptic output device 118 may comprise a smart gel that responds to a stimulus or stimuli by changing in stiffness, volume, transparency, and/or color. In some embodiments, stiffness may comprise the resistance of a surface associated with the haptic output device 118 against deformation. In one embodiment, one or more wires are embedded in or coupled to the smart gel. As current runs through the wires, heat is emitted, causing the smart gel to expand or contract, deforming the surface associated with the haptic output device 118.

In other embodiments, the haptic output device 118 may comprise an actuator coupled to an arm that rotates a deformation component. The actuator may comprise a piezoelectric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move a surface associated with the haptic output device 118, causing it to deform. In some embodiments, the haptic output device 118 may comprise a portion of the housing of the computing device 101 or a component of the computing device 101. In other embodiments, the haptic output device 118 may be housed inside a flexible housing overlaying the computing device 101 or a component of the computing device 101.

In some embodiments, the haptic output device 118 may be configured to output a thermal or electro-tactile haptic effect. For example, the haptic output device 118 may be configured to output a haptic effect comprising a change in a temperature of a surface associated with the haptic output device 118. In some embodiments, the haptic output device 118 may comprise a conductor (e.g., a wire or electrode) for outputting a thermal or electro-tactile effect. For example, in some embodiments, the haptic output device 118 may comprise a conductor embedded in a surface associated with the haptic output device 118. The computing device 101 may output a haptic effect by transmitting current to the conductor. The conductor may receive the current and, for example generate heat, thereby outputting the haptic effect.

Although a single haptic output device 118 is shown here, some embodiments may use multiple haptic output devices of the same or different type to provide haptic feedback. Some haptic effects may utilize an actuator coupled to a housing of the device, and some haptic effects may use multiple actuators in sequence and/or in concert. For example, in some embodiments, multiple vibrating actuators and electrostatic actuators can be used alone or in concert to provide different haptic effects. In some embodiments, the haptic output device 118 may comprise a solenoid or other force or displacement actuator, which may be coupled to the touch sensitive surface 116. Further, the haptic output device 118 may be either rigid or flexible.

Turning to memory 104, program components 124, 126, and 128 are depicted to show how a device can be configured in some embodiments to provide pressure-based haptic effects. In this example, a detection module 124 configures the processor 102 to monitor the touch sensitive surface 116 via the touch sensor 108 to determine a position of a touch. For example, detection module 124 may sample touch sensor 108 in order to track the presence or absence of a touch and, if a touch is present, to track one or more of the location, path, velocity, acceleration, pressure and/or other characteristics of the touch.

Haptic effect determination module 126 represents a program component that analyzes data to determine a haptic effect to generate. Haptic effect determination module 126 may comprise code that determines, for example, based on an interaction with touch sensitive surface 116, a haptic effect to output and code that selects one or more haptic effects to provide in order to output the effect. For example, in some embodiments, some or all of the area of touch sensitive surface 116 may be mapped to a graphical user interface. Haptic effect determination module 126 may select different haptic effects based on the location of a touch in order to simulate the presence of a feature (e.g., a virtual avatar, automobile, animal, cartoon character, button, lever, slider, list, menu, logo, or person) on the surface of touch sensitive surface 116. In some embodiments, these features may correspond to a visible representation of the feature on the interface. However, haptic effects may be output even if a corresponding element is not displayed in the interface (e.g., a haptic effect may be provided if a boundary in the interface is crossed, even if the boundary is not displayed).

In some embodiments, the haptic effect determination module 126 may select a haptic effect based at least in part a characteristic (e.g., a virtual size, width, length, color, texture, material, trajectory, type, movement, pattern, or location) associated with a virtual object. For example, in one embodiment, the haptic effect determination module 126 may determine a haptic effect comprising a vibration if a color associated with the virtual object is blue. In such an embodiment, the haptic effect determination module 126 may determine a haptic effect comprising a change in temperature if a color associated with the virtual object is red. As another example, the haptic effect determination module 126 may determine a haptic effect configured to simulate the texture of sand if the virtual object comprises an associated virtual texture that is sandy or coarse.

In some embodiments, the haptic effect determination module 126 may select a haptic effect based at least in part on a signal from the pressure sensor 132. That is, the haptic effect determination module 126 may determine a haptic effect based on the amount of pressure a user exerts against a surface (e.g., touch sensitive surface 116) associated with the computing device 101. For example, in some embodiments, the haptic effect determination module 126 may output a first haptic effect or no haptic effect if the user exerts little or no pressure against the surface. In some embodiments, the haptic effect determination module 126 may output a second haptic effect or no haptic effect if the user exerts low pressure against the surface. Further, in some embodiments, the haptic effect determination module 126 may output a third haptic effect or no haptic effect if the user exerts a firm pressure against the surface. In some embodiments, the haptic effect determination module 126 may associate different haptic effects with no pressure, soft pressure, and/or firm pressure. In other embodiments, the haptic effect determination module 126 may associate the same haptic effect with no pressure, soft pressure, and/or firm pressure.

In some embodiments, the haptic effect determination module 126 may comprise a finite state machine. A finite state machine may comprise a mathematical model of computation. Upon applying an input to the mathematical model, the finite state machine may transition from a current state to a new state. In such an embodiment, the finite state machine may select haptic effects based on the transition between states. In some embodiments, these state transitions may be driven based in part on a sensor signal from the pressure sensor 132.

In some embodiments, haptic effect determination module 126 may comprise code that determines a haptic effect based at least in part on signals from sensor 130 (e.g., a temperature, an amount of ambient light, an accelerometer measurement, or a gyroscope measurement). For example, in some embodiments, haptic effect determination module 126 may determine a haptic effect based on the amount of ambient light. In such embodiments, as the ambient light decreases, the haptic effect determination module 126 may determine a haptic effect configured to deform a surface of the computing device 101 or vary the perceived coefficient of friction on a surface associated with the haptic output device 118. In some embodiments, haptic effect determination module 126 may determine haptic effects based on the temperature. For example, as the temperature decreases, the haptic effect determination module 126 may determine a haptic effect in which the user perceives a decreasing coefficient of friction on a surface associated with the haptic output device 118.

Haptic effect generation module 128 represents programming that causes processor 102 to transmit a haptic signal to haptic output device 118 to generate the selected haptic effect. For example, haptic effect generation module 128 may access stored waveforms or commands to send to haptic output device 118. As another example, haptic effect generation module 128 may comprise algorithms to determine the haptic signal. Haptic effect generation module 128 may comprise algorithms to determine target coordinates for the haptic effect. These target coordinates may comprise, for example, a location on the touch sensitive surface 116.

Figure 3:
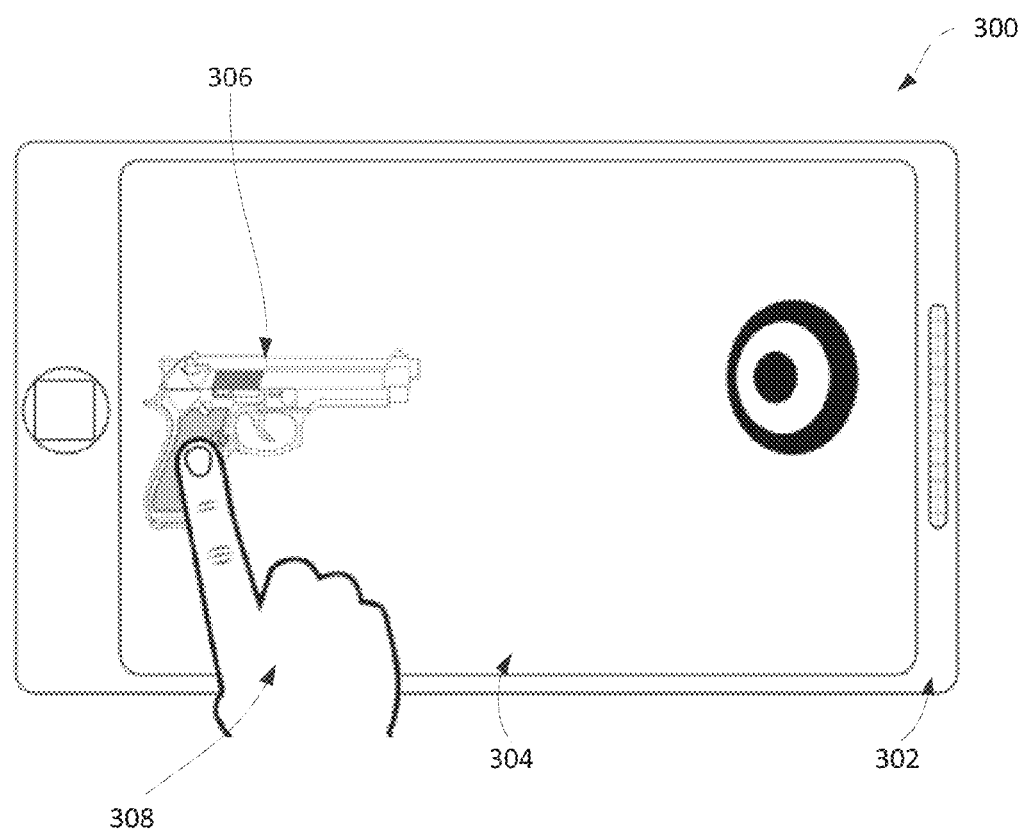
FIG. 3 shows an embodiment of a system for pressure-based haptic effects.

FIG. 3 shows an embodiment of a system for pressure-based haptic effects. The system 300 comprises a computing device 302. As noted above, in some embodiments, the computing device 302 may comprise a tablet, an e-reader, a car computer (e.g., a computer for controlling one or more automobile systems or devices such as stereo, HVAC, lighting, navigation, or other vehicle functions), a medical device, a laptop computer, a desktop computer, a game system, a portable gaming device, a gamepad, or another electronic device. In other embodiments, the computing device 302 may comprise a multifunction controller, for example, a controller for use in a kiosk, automobile, alarm system, thermostat, or other type of computing device. In the embodiment shown in FIG. 3, the computing device 302 comprises a mobile phone, such as a smart phone.

In this example, the computing device 302 also comprises a touch-screen display 304, which combines a touch sensitive surface and a display. The touch-screen display 304 is outputting a user interface (e.g., a game). In some embodiments, the user interface may comprise one or more virtual objects 306. In the embodiment shown in FIG. 3, the virtual object 306 comprises a virtual gun.

A user 308 may interact with the user interface, for example, by tapping, touching, or gesturing (e.g., a two-finger pinch or a swipe) on the touch-screen display 304. In some embodiments, the user 308 may interact with the user interface to play a video game, for example, to shoot the virtual gun at a virtual target.

As discussed above, in some embodiments, the user interface may comprise multiple levels with which a user 308 may interact. The user 308 may interact with the different interface levels by applying a level of pressure associated with that user interface level. For example, in one embodiment the user 308 may feel textures associated with objects in the user interface by applying soft pressure. In such an embodiment, the user 308 may select objects by applying a harder pressure. Thus, the computing device 302 may provide multiple layers of interaction with a virtual object 306, which may enhance the user experience.

In the embodiment shown in FIG. 3, the user may interact with the virtual object(s) 306, for example, to play a video game. The user 308 may interact with the virtual object 306 by applying different amounts of pressure to the touch-screen display 304, for example, to perform game functions. For example, the user may interact with a first level of the user interface by applying a soft pressure to the virtual object 306 (e.g., the virtual gun). In some embodiments, the computing device 302 may perform a game function (e.g., load an ammunition magazine into the virtual gun or aim the virtual gun) associated with the first user interface level. Further, in some embodiments, the user may interact with a second level of the user interface by applying a firm pressure to the virtual object 306. In some embodiments, the computing device 302 may perform a game function (e.g., fire the virtual gun) associated with the second user interface level. In some embodiments, upon the user releasing the firm pressure on the virtual object 306, the computing device 306 may perform another game function (e.g., ejecting the spent casing from the virtual gun) associated with the first user interface level. Thus, the user 306 may be able to perform a plurality of game functions without having to move a finger off of the virtual object 306. This may provide a more intuitive and simplified experience for the user.

The computing device 302 is configured to determine a haptic effect based at least in part on the user interface level. For example, in some embodiments, if the user 308 exerts no pressure on the virtual object 306, the computing device 302 may determine no haptic effect. If the user 308 applies a soft pressure to the virtual object 306, the computing device 302 may output a haptic effect associated with the first user interface level. For example, a haptic effect configured to simulate the texture of the gun handle or grip (e.g., a wood or rubber texture). Further, in some embodiments, if the user 308 applies a firm pressure to the virtual object 306, the computing device 302 may output a haptic effect associated with the second user interface level. For example, a haptic effect configured to simulate the firing of the gun (e.g., a high-magnitude vibration with a shorter duration). In some embodiments, the computing device 302 may output a sound (e.g., a gunshot sound) associated with a user interface level in addition to a haptic effect. Thus, the user may receive haptic and/or audio feedback associated with one or more user interface levels. This may provide an enhanced gaming experience to the user. For example, the user 308 may be able to apply soft pressure to a virtual weapon to determine what type of weapon it is without having to look at the touch-screen display 304. Further, the user 308 may be able apply firm pressure to the virtual weapon to manipulate or fire the weapon without having to look at the touch-screen display 304. Thus, the user may be free to concentrate the user's attention on other game activities.

In some embodiments, a user interface level may be associated with a plurality of functions. For example, in some embodiments, if the user 308 releases the firm pressure, the computing device 302 may perform another function associated with the first user interface level. For example, the computing device 302 may virtually eject a spent ammunition round from the virtual gun. Further, a plurality of haptic effects may be associated with a user interface level. For example, upon the user releasing the firm pressure, the computing device 302 may output another haptic effect associated with the first user interface level. For instance, the computing device 302 may output a haptic effect configured to simulate ejecting a used ammunition round from the virtual gun (e.g., a low-magnitude vibration with a shorter duration). Further, if the user 308 releases the soft pressure, the computing device 302 may perform another function and/or output a haptic effect. For example, the computing device 302 may output a haptic effect configured to simulate unloading the magazine from the weapon (e.g., a low-magnitude vibration with a longer duration). Thus, the user 308 may perform different functions by applying different levels of pressure one or more virtual objects displayed in a user interface. Further, the computing device 302 may determine and output different haptic effects associated with function and/or the level of pressure.

As another example, in some embodiments, the computing device 302 may comprise a simulator. The simulator may be configured to output a virtual object 306 and simulate physical interactions with the object. For example, the simulator may output a virtual carbonated beverage can (e.g., a soda or beer can) and be configured to simulate interactions with a real carbonated beverage can. In some embodiments, upon the user 308 applying a soft pressure to the virtual carbonated beverage can, the computing device 302 may output a haptic effect associated with the first user interface level. For example, a haptic effect configured to simulate the release of carbonation (e.g., a low-magnitude vibration with a longer duration). In some embodiments, upon the user 308 applying a firm pressure to the virtual object 306, the computing device 302 may output a haptic effect associated with the second user interface level. For example, a haptic effect configured to simulate opening the tab of a can (e.g., a high-magnitude vibration with a shorter duration). Upon the user 308 releasing the firm touch, the computing device 302 may output another haptic effect associated with the first user interface level. For example, a haptic effect configured to simulate pouring of the beverage (e.g., a flow sensation).

Still another example may comprise a virtual object 306 comprising a virtual car. A user 306 may be able to drive the virtual car in a video game. In some embodiments, if the user 308 applies soft pressure to the virtual object 306, the computing device 302 may, for example, start the virtual car's engine. The computing device 302 may also output a haptic effect, for example, configured to simulate the rumble of an engine starting (e.g., a long, low frequency vibration). In some embodiments, if the user 308 applies firm pressure to the virtual object 406, the computing device 302 may, for example, accelerate the virtual car. The computing device 302 may output a haptic effect, for example, configured to simulate pressing the accelerator of a car. In some embodiments, upon the user 308 releasing the firm pressure, the computing device 302 may, for example, stop the car and/or turn off the car's ignition. The computing device 302 may also output another haptic effect, for example, configured to simulate turning off the ignition of a car (e.g., the computing device 302 may stop outputting a haptic effect). Thus, the user may be able to play a video game without having to move a finger off of a virtual object, which may make the video game easier to play.

In some embodiments, the virtual object 306 may comprise a virtual guitar. A user 306 may be able to play the virtual guitar in a video game. In some embodiments, if the user 308 applies soft pressure to the virtual object 306, the computing device 302 may, for example, lightly strum the virtual guitar. The computing device 302 may also output a haptic effect, for example, configured to simulate the vibration of a guitar string (e.g., a vibration with a magnitude that decays over time). In some embodiments, if the user 308 applies firm pressure to the virtual object 406, the computing device 302 may, for example, intensely strum of the virtual guitar. The computing device 302 may output a haptic effect, for example, configured to simulate intensely strumming a guitar string. Thus, the user may be able to play the virtual modulate the intensity of the user's strumming without having to move a finger. This may make the video game easier to play.

In some embodiments, the user 308 may be able to interact with multiple parts of a virtual object 306 using an amount of pressure associated with a user interface level. Each part of the virtual object 306 may be associated with a different function. For example, a virtual object 306 may comprise a water bowl. A user 308 may be able to interact with the rim of the virtual water bowl to perform a function (e.g., select the virtual water bowl) associated with a user interface level. The user 308 may also be able to interact with the virtual water in the water bowl to perform another function (e.g., splash the water as part of a video game) associated with the user interface level.

Further, the computing device 302 may output a haptic effect based at least in part on the virtual object 306 with which the user is interacting. For example, in the embodiment described above, if the user 308 applies light pressure to the water in the virtual water bowl, the computing device 302 may output a haptic effect associated with the first user interface level and the water. For example, a haptic effect configured to simulate the feeling of water (e.g., a simulated water texture or a reduction in the perceived coefficient of friction on the surface of the touch-screen display 304). Further, if the user 308 applies light pressure to the rim of the virtual water bowl, the computing device 302 may output another haptic effect associated with the first user interface level and the rim. For example, a haptic effect configured to simulate the feeling of the rim of a bowl (e.g., a simulated ceramic or glass texture). In some embodiments, if the user 308 applies a firm pressure to the water in the virtual water bowl, the computing device 302 may output a haptic effect associated with the second user interface level and the water. For example, a haptic effect configured to simulate splashing the water (e.g., a plurality of high frequency vibrations with short durations). In such an embodiment, if the user 308 applies a firm pressure to the rim of the virtual water bowl, the computing device 302 may output another haptic effect associated with the second user interface level and the rim. For example, a haptic effect configured to simulate glass breaking (e.g., a plurality of short vibrations).

Figure 4:
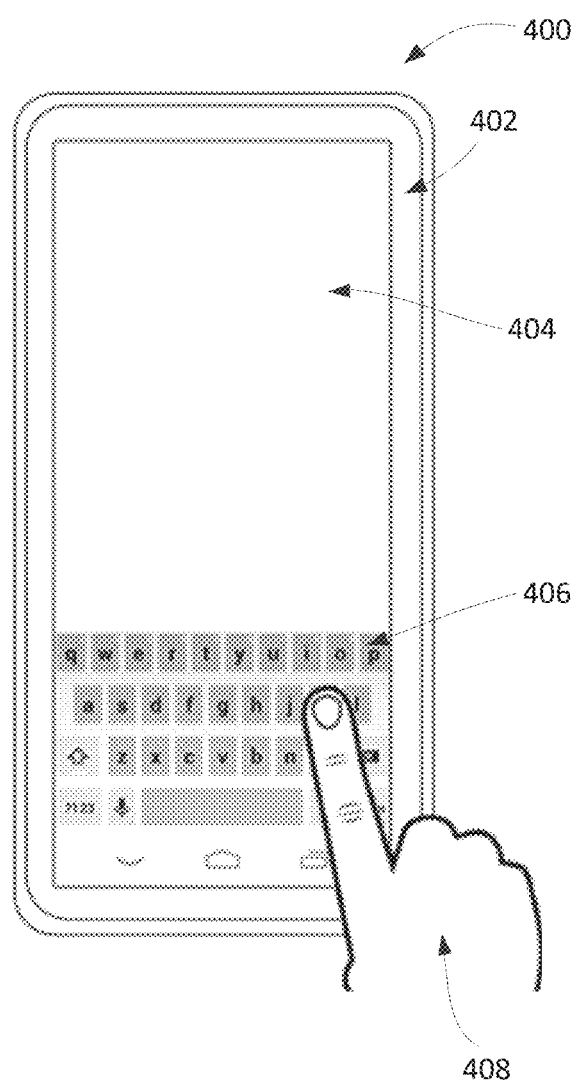
FIG. 4 shows another embodiment of a system for pressure-based haptic effects.

FIG. 4 shows another embodiment of a system for pressure-based haptic effects. The system 400 comprises a computing device 402, e.g., a smartphone or tablet.

The computing device 402 also comprises a touch-screen display 404. The computing device 402 may output a virtual object 406 on the touch-screen display 404. The virtual object 406 may comprise any type or number of objects, for example, buttons, sliders, knobs, lists, menus. For instance, in some embodiments, the virtual object 406 may comprise a phone number input screen. The phone number input screen may comprise a plurality of buttons, for example, with the digits 0-9, a star symbol, and a pound symbol. In the embodiment shown in FIG. 4, the virtual object 406 comprises a virtual keyboard. A user 408 may interact with the virtual object 406 via the touch-screen display 404.

As discussed above, the computing device 402 is configured to categorize a pressure exerted by the user 408 on the computing device 402 into one of a plurality of pressure levels (e.g., no pressure, soft pressure, or firm pressure). Any number or configuration of pressure levels may be possible. Pressure levels may be discrete (i.e., separate and distinct). In some embodiments, each pressure level may be associated with a user interface level.

In some embodiments, a user interface level may be associated with haptic effects configured to provide guidance information to the user. For example, in some embodiments, the user 408 may explore the virtual object 406 with a finger using an amount of pressure associated with a user interface level. For instance, the user 408 may explore the virtual keyboard using soft pressure, e.g., by pressing on the screen lightly with a finger. Upon the user 408 interacting with the edge of the virtual object 406, the computing device 402 may output a haptic effect. For instance, upon the user 408 interacting with an edge of a virtual keyboard key, the computing device 402 may output a haptic effect. The haptic effect may be configured to simulate the edge of the virtual object. For instance, the computing device 402 may output a haptic effect configured to simulate the edge of a keyboard key by deforming the surface of the touch-screen display 404 to generate a bump or ridge perceivable by the user 408. This may allow the user 408 to determine the position of the user's finger. For example, the user 408 may be able to determine if the user's finger is transitioning between virtual keyboard keys as the user 408 explores the virtual keyboard.

In some embodiments, after the user has located the edge of a key, the user may press the key to enter the letter associated with that key. In such an embodiment, the user may use a different user interface level, e.g., a level associated with firm pressure, in order to press the key. Thus, in some embodiments, one user interface level may be used for guidance (e.g., to alert the user to locations on the display) and another user interface level may be associated with selecting a particular virtual item for further interaction.

Further, in some embodiments, upon the user selecting a key, the computing device 302 may output a haptic effect associated with the user interface level. For example, a haptic effect may be configured to provide the user with confirmation that the key press has been received (e.g., a short vibration). Thus, a user may be able to determine if the computing device 402 has registered the key press without having to look at the touch-screen display 404.

In some embodiments, upon the user 408 interacting with another piece of the virtual object, the computing device 402 may output a different haptic effect. For example, upon the user interacting with the center of a virtual keyboard key, the computing device 402 may output a haptic effect. The haptic effect may be configured to simulate the texture of a keyboard key, for example, a plastic texture. This may allow the user 408 to determine that the user's finger is over the center of a virtual keyboard key. As another example, in some embodiments, upon the user 408 interacting with one or more orientation keys on the virtual keyboard (e.g., a key on a keyboard configured to orient the user 408 to the position of their finger on the keyboard) such as the "F" and "J" keys, the computing device 402 may output a haptic effect. For example, the computing device 402 may output a low-magnitude vibration with a short duration. This may allow a user 408 to determine the position of the user's finger on the virtual keyboard.

In some embodiments, the user interface may be configured to simulate physical interactions with real-world objects. For example, in some embodiments, the virtual object 406 may comprise a virtual brick. The user 408 may "grab" (e.g., select) the virtual object 406 by interacting with the virtual object 406 while applying a soft pressure. Upon the user 408 grabbing the virtual object 406, the computing device 402 may output a haptic effect. For example, a haptic effect configured to simulate a brick (e.g., a simulated brick texture). Further, the user 408 may drag the virtual object 406 to a new location, for example, by moving a finger along the touch-screen display 404 while applying firm pressure. Upon the user 408 moving the virtual brick, the computing device 402 may output a haptic effect. For example, a haptic effect configured to simulate moving a brick (e.g., a perceivable increase in a coefficient of friction on the surface of the touch-screen display 404). The user 408 may drop the virtual object 406 in a new location, for example, by releasing the firm pressure. In some embodiments, when the user drops the virtual object the computing device 402 may output a haptic effect, for example, configured to simulate dropping a brick (e.g., a high-magnitude, short duration vibration).

As another example, in some embodiments, the computing device 402 may comprise a game. The game may comprise a virtual object 406 comprising bubble wrap. As the user 408 interacts with the touch screen display 404, the computing device 402 may output a haptic effect. For example, a haptic effect configured to simulate the feeling of bubble wrap (e.g., a simulated a plastic texture). In such an embodiment, as the user 408 applies additional pressure to the touch-screen display 404, the user may pop the virtual bubble wrap. In such an embodiment, the computing device 402 may output a haptic effect configured to simulate the bubbles popping (e.g., a high-magnitude, short duration vibration). In some embodiments, the computing device 402 may also output one or more images of the bubble wrap popping and/or play a popping sound.

Figure 5:
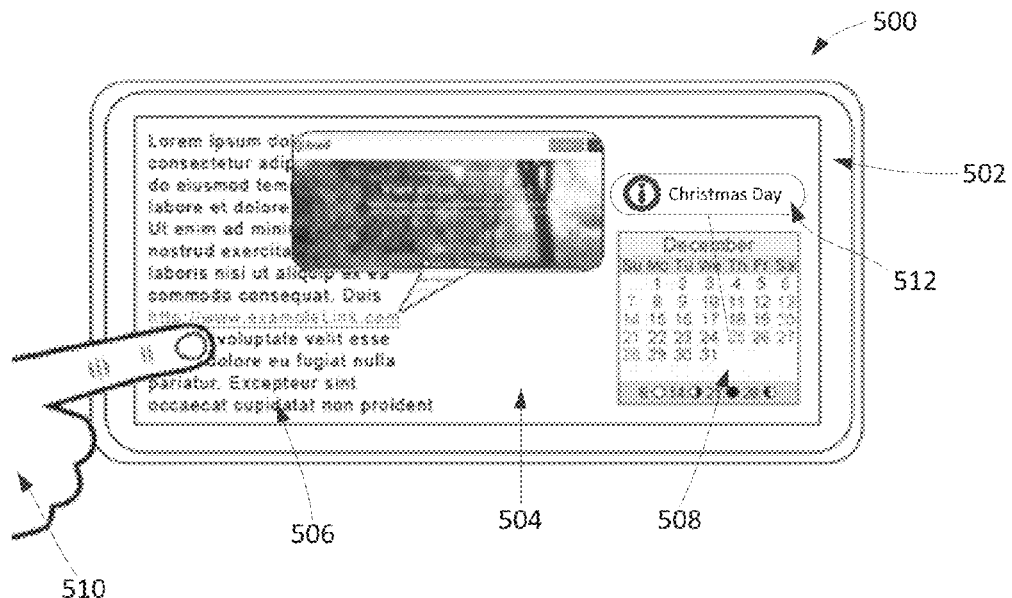
FIG. 5 shows still another embodiment of a system for pressure-based haptic effects.

FIG. 5 shows still another embodiment of a system for pressure-based haptic effects. The system 500 comprises a computing device 502. In this example, the computing device 502 comprises a smartphone, e-reader, or tablet.

The computing device 502 also comprises a touch-screen display 504. The computing device 502 may output via the touch-screen display 504 a user interface comprising a plurality of virtual objects. A user 510 may interact with the touch-screen display 504 and/or the virtual objects. As described above, the computing device 502 is configured to categorize the pressure exerted by the user 510 on the computing device 502 into one of a plurality of pressure levels (e.g., no pressure, soft pressure, or firm pressure). In some embodiments, each pressure level may be associated with a user interface level.

In some embodiments, the user interface may be configured to provide information to a user. For example, in some embodiments, a user 510 may interact with (e.g., touch) a hyperlink associated with a virtual object 506. The user 510 may interact with the hyperlink using an amount of pressure associated with a user interface level, for instance, to perform a function. For example, the user may interact with the hyperlink using soft pressure to view a preview of the associated webpage (e.g., in a popup bubble). As another example, the user may interact with the hyperlink using soft pressure to view other data (e.g., HTML or other code, website statistics or trends, or metadata encoded within the webpage content) associated with the webpage. The computing device 502 may output a haptic effect associated with the user interface level (e.g., a medium magnitude, medium duration vibration). In some embodiments, the user 510 may interact with the hyperlink using another amount of pressure associated with another user interface level, for example, to perform another function. For example, the user 510 may interact with the hyperlink using firm pressure. In some embodiments, the firm pressure may cause the computing device 502 to open a browser window directed to the webpage associated with the hyperlink. In such an embodiment, the computing device 502 may output a haptic effect. For example, a haptic effect configured to simulate a button press.

In some embodiments, the computing device 502 may output one or more haptic effects configured to simplify user interactions with the user interface. For example, in some embodiments, a user 510 may swipe a finger along the touch-screen display 504 using soft pressure to scroll through text. In some embodiments, the computing device 502 may output a haptic effect configured to decrease the coefficient of friction on the surface of the touch-screen display 504. Decreasing the coefficient of friction on the surface of the touch-screen display 504 may make it easier for a user to move a finger along the surface of the touch-screen display 504 to scroll through text.

Further, in some embodiments, the user 510 may interact with a virtual object 506 using an amount of pressure (e.g., a firm pressure) associated with another user interface level to perform another function. For example, the user 510 may interact with the virtual object 506 using firm pressure to select text. In some embodiments, the computing device 502 may output a haptic effect. For example, a haptic effect configured to notify the user 510 that the text has been selected (e.g., a medium magnitude, short duration vibration). This may prevent the user 510 from erroneously selecting or modifying text.

In some embodiments, upon a user interacting with a virtual object 508 (e.g., a calendar) with an amount of pressure associated with a user interface level, the computing device 502 may display one or more new virtual objects 512 (or update the virtual object 508). For example, in some embodiments, the computing device 502 may output a tool tip (e.g., a popup configured to provide information to a user) upon the user interacting with a virtual object. The computing device 502 may also output a haptic effect. In some embodiments, if the user 510 applies additional pressure, the computing device 502 may change or update a virtual object 508 on the touch-screen display 504. For example, the computing device 502 may change the month output on the virtual calendar from December to January. In some embodiments, the computing device 502 may also output a haptic effect.

In some embodiments, the user 510 may be able to interact with the new virtual object 512 (e.g., the tool tip) using various amounts of pressure (e.g., no pressure, soft pressure, or firm pressure). For example, in some embodiments, if the user 510 interacts with the tool tip with soft pressure, the computing device 502 may output additional textual information. The computing device 502 may also output a haptic effect. In such an embodiment, if the user 510 interacts with the tool tip with firm pressure, the computing device may play a sound or video (e.g., to provide additional non-textual information to a user). The user 510 may be able to interact with any number of virtual objects using an amount of pressure associated with one of any number of user interface levels.

Figure 6:
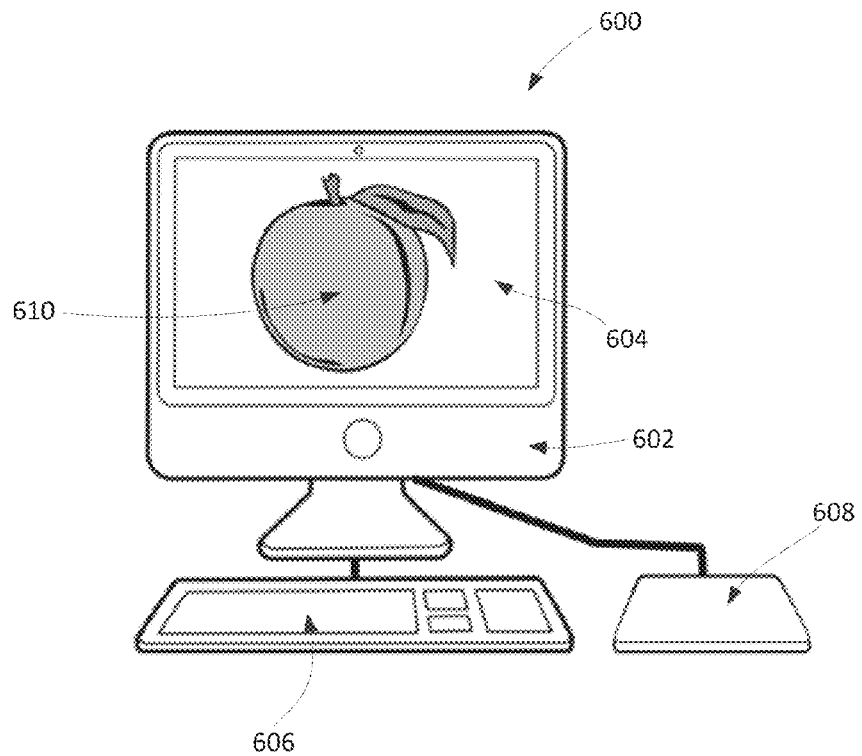
FIG. 6 shows yet another embodiment of a system for pressure-based haptic effects.

FIG. 6 shows yet another embodiment of a system for pressure-based haptic effects. The system 600 comprises a computing device 602. In this example, the computing device 602 comprises a desktop computer. The computing device 602 is in communication with a user input device 606 (e.g., a keyboard). The computing device 602 is also in communication with a touch sensitive surface 608. A user may interact with the computing device 602 via the user input device 606. Further, a user may interact with the computing device 602 by touching, gesturing on, or otherwise interacting with the touch sensitive surface 608.

The computing device 602 further comprises a display 604. The computing device 602 may output a user interface comprising a virtual object 610 on the display 604. In the embodiment shown in FIG. 6, the computing device 602 is outputting a virtual object 610 comprising a peach.

In some embodiments, the computing device 602 may be configured to simulate interacting with the virtual object 610 at different depths or interacting with different surfaces of the virtual object 610. For instance, the user may interact with the virtual peach using soft pressure. In response, the computing device 602 may output a haptic effect associated the soft pressure. For example, the computing device 602 may output a haptic effect configured to simulate the fuzz or skin of the peach. Further, in some embodiments, the user may interact with the virtual object 610 using firm pressure. In response, the computing device 602 may output a haptic effect associated firm pressure. For example, the computing device 602 may output a haptic effect configured to simulate the squishy or soft texture of the inside of a peach as the user presses into the peach. In this manner, a user may perceive different surfaces or depths of a virtual object 610 by interacting with a user interface using different pressures.

As another example, in some embodiments, the virtual object 610 may comprise a cardboard box filled with nails. In some embodiments, a user may interact with the virtual cardboard box with soft pressure. In response, the computing device 602 may output a haptic effect configured to simulate cardboard (e.g., a cardboard texture). In some embodiments, the user may interact with the virtual cardboard box of nails using firm pressure. In response, the computing device 602 may output a haptic effect configured to simulate the nails inside the cardboard box (e.g., a metal texture). Thus, the user may perceive both the outside and interior of the virtual cardboard box by interacting with the cardboard box using different amounts of pressure.

In some embodiments, the virtual object 610 may comprise one or more icons. A user may interact with an icon using soft pressure. In response, the computing device 602 may perform a function, for example, the computing device 602 may highlight the icon. Highlighting the icon may alert the user that the icon can be activated (e.g., is clickable). The computing device 602 may also output a haptic effect, for example, configured to alert the user that the icon can be activated. In such an embodiment, the user may interact with the icon using firm pressure. In response, the computing device 602 may perform a function, for example, the computing device 602 may open the program associated with the icon. The computing device 602 may output a haptic effect associated with the program or otherwise execute a command associated with activating the icon. For example, the computing device 602 may output a haptic effect configured associated with the brand or manufacturer of the program. Thus, in some embodiments, a user may be able to locate icons that can be activated without having to view the display 604. Further, the user may be able to open programs or execute other commands associated with the icons without having to view the display 604. Thus, the user may be free to concentrate on other activities while interacting with the user interface.

Figure 7:
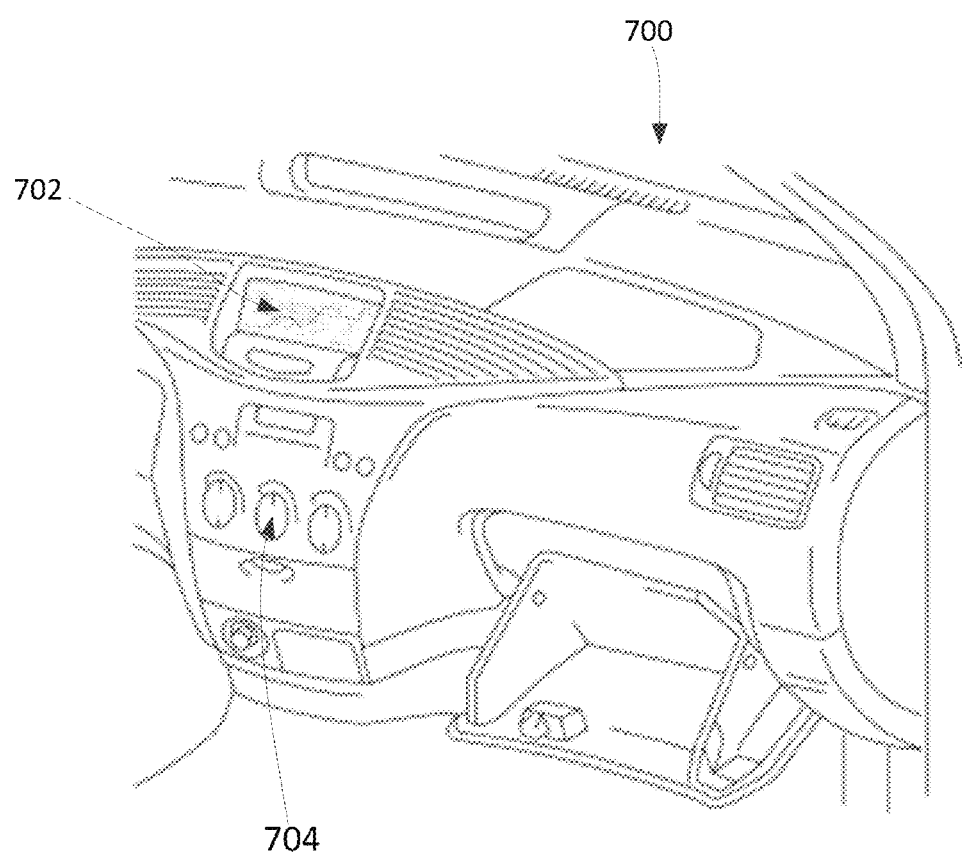
FIG. 7 shows another embodiment of a system for pressure-based haptic effects.

FIG. 7 shows another embodiment of a system for pressure-based haptic effects. The system 700 comprises a computing device. In this example, the computing device comprises a car computer (e.g., a computer for controlling one or more automobile systems or devices). The system 700 comprises a touch-screen display 702. The computing device may output a user interface comprising one or more virtual objects via the touch-screen display 702. A user may provide input to the computing device by interacting with the touch-screen display 702. The system 700 may also comprise one or more touch sensitive buttons 704, joysticks, gear shifters, or other user interface devices.

In some embodiments, the computing device may output a user interface configured to allow a user to interact with the user interface without having to visually focus on the user interface. For example, in some embodiments, the computing device may output a user interface comprising a map (e.g., for navigation). In some embodiments, a user may interact with the map using soft pressure. The computing device may detect the soft pressure and associate the soft pressure with a user interface level configured to, for example, turn on GPS navigation. The computing device may output an associated haptic effect. For example, a haptic effect configured to confirm that the computing device has turned on navigation (e.g., a small-magnitude, short duration vibration).

Further, in some embodiments, the user may interact with a point on the virtual map using firm pressure. The computing device may detect the firm pressure and associate the firm pressure with a user interface level configured to output information associated with the point. The information may comprise, for example, nearby gas stations, restaurants, movie theaters, police stations, or hospitals, or other information such as traffic conditions, speed limits, or town history. In some embodiments, the computing device may output a haptic effect based at least in part on the content of the information. For example, if the information comprises a nearby gas station, the computing device may output a haptic effect configured to simulate the rumbling of a car engine (e.g., a low-magnitude, long duration vibration). As another example, if the information comprises poor traffic conditions, the computing device may output a haptic effect configured to simulate "stop-and-go" traffic conditions (e.g., four medium-magnitude vibrations with short durations, spaced apart by equal time intervals). In this manner, the user may be able interact with the system 700 and receive information without having to take the user's eyes off the road.

Illustrative Methods for Pressure-Based Haptic Effects

Figure 8:
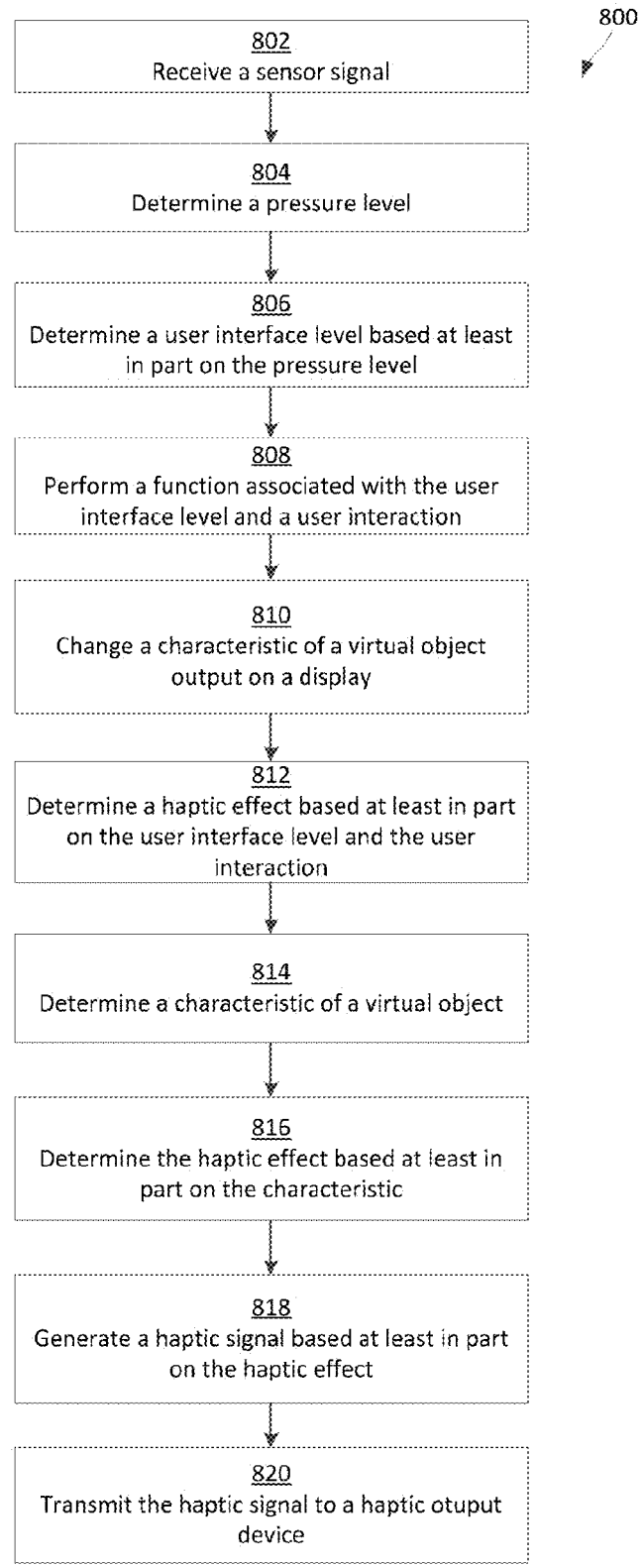
FIG. 8 is a flow chart of steps for performing a method for providing pressure-based haptic effects according to one embodiment.

FIG. 8 is a flow chart of steps for performing a method for providing pressure-based haptic effects according to one embodiment. In some embodiments, the steps in FIG. 8 may be implemented in program code that is executed by a processor, for example, the processor in a general purpose computer, a mobile device, or a server. In some embodiments, these steps may be implemented by a group of processors. In some embodiments one or more steps shown in FIG. 8 may be omitted or performed in a different order. Similarly, in some embodiments, additional steps not shown in FIG. 8 may also be performed. The steps below are described with reference to components described above with regard to system 100 shown in FIG. 1.

Further, the steps below are described with reference to a drawing application. A user may interact with the drawing application to draw a virtual picture. The user may interact with the drawing application, for example, by swiping a finger along the surface of the touch sensitive surface 116.

The method 800 begins at step 802 when the processor 102 receives a sensor signal from the pressure sensor 132. The sensor signal may be associated with the amount of pressure with which a user may be interacting with a touch sensitive surface 116. For example, the user may swipe a finger along the touch sensitive surface 116 to perform a function associated with the drawing application, such as to draw a line. The pressure sensor 132 may detect an amount of pressure associated with the swipe and transmit the sensor signal to the processor 102.

The method 800 continues at step 804 when the processor 102 determines a pressure level (e.g., based on the sensor signal). As noted above, a pressure level comprises a range of pressures falling between two pressure thresholds. In some embodiments, the processor 102 may determine if the detected pressure falls within a range of pressures associated with a pressure level (e.g., a soft pressure level or a firm pressure level). If so, the processor 102 may determine the pressure level. For example, if the detected pressure falls within the range of the soft pressure level, the processor 102 may determine the soft pressure level.

The method 800 continues at step 806 when the processor 102 determines a user interface level based at least in part on the pressure level. In some embodiments, the processor 102 may rely on programming contained in memory 104 to determine the user interface level. For example, in some embodiments, memory 104 may comprise a lookup table. In some embodiments, the processor 102 may use the lookup table to associate pressure levels with particular user interface levels. For example, the processor 102 may consult the lookup table and associate the soft pressure level with a first user interface level.

In some embodiments, the processor 102 may associate a single pressure level with a user interface level. For example, the processor 102 may associate a soft pressure with a first user interface level and a firm pressure with a second user interface level. In other embodiments, the processor 102 may associate a plurality of pressure levels with a user interface level. For example, in some embodiments, the processor 102 may associate a soft pressure and a firm pressure with a single user interface level.

The method continues at step 808 when the processor 102 performs a function associated with the user interface level and/or the user interaction. In some embodiments, the function may comprise outputting, removing, changing, updating, or deleting a virtual object in a user interface. For example, if the user applies soft pressure to the touch sensitive surface 116, the processor 102 may perform a function associated with the first user interface level and the user interaction. The function may comprise, for example, drawing a black line in the drawing application with a shape that mimics the path of the user's finger moving along the touch sensitive surface 116. If the user applies firm pressure to the touch sensitive surface 116, the processor 102 may perform a function associated with the second user interface level and the user interaction. The function may comprise, for example, erasing a portion of the virtual picture associated with the user interaction.

In other embodiments, the function may comprise outputting audio data, video data, or information (e.g., a nearby gas station, restaurant, movie theater, police station, or hospital, or a traffic condition or a speed limit). For example, in some embodiments, upon the user applying firm pressure to the touch sensitive surface 116, the processor 102 may output audio data comprising instructions on how to use the drawing application. In some embodiments, the function may comprise placing a telephone call; sending a text message, SMS message, or e-mail; opening a web browser or accessing a website; opening an application; performing background processing; performing foreground processing; saving a file; opening a file; performing a game function; receiving data; sending data; or any other number or configuration of computer functions. For example, in some embodiments, upon the user removing pressure from the touch sensitive surface 116, the processor 102 may save the virtual picture.

The method continues at step 810 when the processor 102 changes a characteristic (e.g., visibility, type, size, shape, width, length, color, pattern, location, movement, or content) of a virtual object output on a display based at least in part on a user interaction. For instance, upon the user applying soft pressure to the touch sensitive surface 116, the processor 102 may change a cursor image associated with the user interaction from a default image to a paint brush. This may signify to the user that the user can draw a line using soft pressure. Further, upon the user applying firm pressure to the touch sensitive surface 116, the processor 102 may change a cursor image to an eraser. This may signify to the user that the user can erase a portion of the virtual image using firm pressure.

The method 800 continues at step 812 when the processor 102 determines a haptic effect based at least in part on the user interface level and the user interaction. In some embodiments, the processor 102 may rely on programming contained in haptic effect determination module 126 to determine the haptic effect. In some embodiments, the processor 102 may associate a plurality of haptic effects with each user interface level or user interaction.

In some embodiments, the processor 102 may associate a different haptic effect for each user interface level or user interaction. For example, the processor 102 may associate the first user interface level with a haptic effect comprising a decrease in a perceivable coefficient of friction on the surface of touch sensitive surface 116. This may make drawing easier for the user, because the user may be able to more easily move a finger along the surface of touch sensitive surface 116. The processor 102 may associate a second user interface level with a haptic effect comprising a vibration. This may alert the user that a setting has change, which may be appropriate if the function associated with the second user interface level comprises, for example, changing a paint setting (e.g., changing the color of the paint tool).

In some embodiments, the processor 102 may determine the haptic effect based on the amount of pressure associated with a user interaction. For example, in some embodiments, the processor 102 may determine a haptic effect if the user interacts with the touch sensitive surface 116 below a pressure threshold. For instance, the processor 102 may determine a haptic effect comprising an electrostatic haptic effect (e.g., a change in a perceivable coefficient of friction) if the user interacts with the touch sensitive surface 116 with soft pressure. Further, in some embodiments, the processor 102 may determine a different haptic effect if the user interacts with the touch sensitive surface 116 above the pressure threshold. For example, the processor 102 may determine a haptic effect comprising a vibration if the user interacts with the touch sensitive surface 116 with firm pressure. In some embodiments, the processor 102 may output different haptic effects based on the amount of pressure because the quality of a haptic effect as perceived by the user may change with pressure. For example, the quality of an electrostatic haptic effect may be perceived as worse by a user if the user applies more pressure to the touch sensitive surface 116.

In some embodiments, the processor 102 may determine the haptic effect based in part on a signal from the touch sensor 108, the sensor 130, an event, or an algorithm. An event, as used herein, is any interaction, action, collision, or other event which occurs during operation of the device which can potentially comprise an associated haptic effect. In some embodiments, an event may comprise user input (e.g., a button press, manipulating a joystick, interacting with a touch-sensitive surface, tilting or orienting the user interface device), a system status (e.g., low battery, low memory, or a system notification, such as a notification generated based on the system receiving an incoming call), sending data, receiving data, or a program event (e.g., if the program is a game, a program event may comprise explosions, gunshots, collisions, interactions between game characters, advancing to a new level, or driving over bumpy terrain). For example, in some embodiments, the processor 102 may associate an incoming call with a haptic effect comprising a vibration. If the user is contacting the computing device 101 during the incoming call with an amount of pressure associated with a user interface level, the processor 102 may determine a haptic effect comprising a low-magnitude vibration. If the user is contacting the phone during the incoming call with an amount of pressure associated with another user interface level, the processor 102 may determine a different haptic effect, for example, a haptic effect comprising a high-magnitude vibration.

In some embodiments, haptic effect determination module 126 may comprise a lookup table. In some embodiments, processor 102 may use the lookup table to associate events, user interactions, or user interface levels with particular haptic effects (e.g., textures). In some embodiments, the lookup table may comprise data associated with features of a user interface or user interface levels and a plurality of available haptic effects. For example, some embodiments, the lookup table may comprise data associated with user interactions with a user interface, such as sliding a user's finger over a virtual button, and a plurality of available haptic effects. For example, in such an embodiment, in response to a user sliding a finger over a virtual button, the processor 102 may consult the lookup table. Based on the lookup table, the processor 102 may determine a haptic effect to be output by the haptic output device 118 wherein the perceived coefficient of friction on the touch sensitive surface 116 is increased. In some embodiments, the amount of the increase may be based on the user interface level. In some embodiments, the plurality of available haptic effects may comprise a plurality of textures. For example, the plurality of textures may comprise one or more of the textures of: sand, glass, ice, rubber, water, or any other available texture.

In some embodiments, users may have "haptic profiles" in which a user can determine and save in memory 104 a "profile" of the haptic effects the user would like associated with particular events, user interactions, and/or user interface levels. For example, in some embodiments, a user can select from a list of available haptic effects and associate one or more of these haptic effects with a user interaction. In one embodiment, the list may comprise, for example, haptic effects such as a fast flow sensation, slow flow sensation, intense vibration, light vibration, or textures such as bumpy, rubbery, or smooth. In some embodiments, the user may associate multiple haptic effects with a particular virtual object and, in some embodiments, each haptic effect may be associated with a different user interaction. The processor 102 may consult with the user's haptic profile to determine which haptic effect to generate. For example, if the user's haptic profile associates a swipe along a virtual slider with a vibration, in response to the user swiping along the virtual slider, the processor 102 may determine a haptic effect in which the user perceives a vibration.

The method continues to step 814 when the processor 102 determines a characteristic of a virtual object. In some embodiments, the characteristic may comprise the visibility, type, size, shape, width, length, color, pattern, location, movement, or content of the virtual object. In some embodiments, the processor 102 may determine a characteristic of a virtual object with which a user has interacted, for example, via touch sensitive surface 116. For example, the processor 102 may determine one or more colors associated with virtual picture drawn by the user. For instance, the processor 102 may determine that the colors associated with the virtual picture are orange and blue.

The method continues at step 816 when the processor 102 determines a haptic effect based at least in part on the characteristic of the virtual object. For example, the processor 102 may determine a haptic effect based at least in part on the visibility, type, size, shape, width, length, color, pattern, location, movement, or content of the virtual object. In some embodiments, the processor 102 may use any of the methods (e.g., an algorithm, haptic profile, or lookup table) described with respect to step 812 to determine the haptic effect based at least in part on the characteristic of the virtual object. For example, the processor 102 may consult a lookup table and associate the mix of orange and blue colors with a haptic effect comprising a vibration. This may signify to the user that orange and blue may not be aesthetically pleasing together.

The method 800 continues at step 818 when the processor 102 generates a haptic signal associated with the haptic effect. The haptic signal is based at least in part on the haptic effect. In some embodiments, the processor 102 may access drive signals stored in memory 104 and associated with particular haptic effects. In one embodiment, a signal is generated by accessing a stored algorithm and inputting parameters associated with a haptic effect. For example, in such an embodiment, an algorithm may output data for use in generating a drive signal based on amplitude and frequency parameters. As another example, a haptic signal may comprise data to be decoded by the actuator. For instance, the actuator may itself respond to commands specifying parameters such as amplitude and frequency. The haptic signal may be analog or digital.

The method 800 continues at step 820 when the processor 102 transmits the haptic signal to a haptic output device 118. The haptic output device 118 is configured to receive the haptic signal and output the haptic effect. For example, the haptic output device 118 may receive a haptic signal and output a haptic effect comprising, for example, a decrease in a perceivable coefficient of friction on the touch sensitive surface 116 and/or a vibration. These haptic effects may, for example, make drawing easier for the user, or alert the user to colors in the user's virtual picture that may not be aesthetically pleasing together.

Advantages of Pressure-Based Haptic Effects

There are numerous advantages to pressure-based haptic effects. Such systems may allow the user to make a state determination (e.g., determine the mode a device is in) without looking at the device. Thus, the user may be able to maintain focus on other tasks. For example, a user may be able to make determinations with regard to available operations in a program or on a user interface, without having to visually focus on the display. Similarly, a haptic effect may serve as a confirmation that an operation is available, has been completed, or is of a certain level of importance.

In some embodiments, pressure-based haptic effects may allow for more unique, interactive, and effective user interfaces. For example, in some embodiments, a user may be able to perform a broader range of functions while interacting with a single user interface component by applying varying amounts of pressure to the user interface component. Further, in some embodiments, a user may be able to locate the position of a user interface component using one amount of pressure (e.g., soft pressure) and activate the user interface component by using another amount of pressure (e.g., firm pressure). Thus, the user may be able to locate user interface components and execute associated functions without having to remove the user's finger from the user interface. This is unlike a traditional user interface, in which a user may have to remove their finger from the user interface and to perform a tap to activate a user interface component. Such tapping can be challenging, for example, in a moving vehicle, in which ambient motion, cognitive load, and visual distractions may make it difficult to precisely tap on a user interface component.

In other embodiments, pressure-based haptic effects may enable non-visual interfaces. For example, in some embodiments, a user may be able explore a non-visual user interface with the user's finger using an amount of pressure associated with a user interface level. Upon the user's finger interacting with the location of an invisible interface component (e.g., a virtual volume switch), the computing device may output haptic feedback. This may allow the user to identify the location of the invisible interface component. Upon identifying the location of the interface component, the user may be able to interact with (e.g., press on) the interface component with an amount of pressure associated with another user interface level, for example, to perform a function associated with the invisible interface component (e.g., increasing a volume). In response, the system may perform the function and/or provide the user with haptic feedback, for example, to confirm receipt of the user input.

In some embodiments, pressure-based haptic effects may provide a more realistic or immersive user experience. For example, in some embodiments, a user may interact with a virtual object using an amount of pressure associated with a pressure level. The user may receive haptic feedback configured to simulate a surface (e.g., the outside of a piece of fruit) associated with the virtual object. The user may further interact with the virtual object using an amount of pressure associated with another pressure level. The user may receive haptic feedback configured to simulate a different surface (e.g., the inside of a piece of fruit) associated with the virtual object. In some embodiments, this may make the virtual object feel more realistic and/or three-dimensional. Further, by associating different haptic effects with different pressure levels, a user may be able to perceive a plurality of haptic effects while interacting with a single virtual object. This may allow for a greater range of haptic experiences.

In some embodiments, pressure-based haptic effects may provide a safer user experience. For example, with traditional touch sensitive interfaces, it may be difficult for a user to determine how much pressure to exert (or how much pressure the user is exerting) when interacting with a touch sensitive surface so that the computing device registers the user input. This may cause a user to interact with the touch sensitive surface with a high amount of pressure, which may damage the touch sensitive surface, injure the user, or cause fatigue or strain. In some embodiments, however, pressure-based haptic effects may notify a user that the computing device has received the user input or that the user has interacted with a virtual object with the correct amount of pressure. Thus, the user may interact with the touch sensitive surface using less overall pressure, thereby preventing injury to the user or damage to the computing device.

Further, in some embodiments, pressure-based haptic effects may allow computing devices to replace conventional switches. This may allow computing devices to operate as multifunction controllers and/or to be used in previously unused places. In some embodiments, using computing devices as multifunction controllers or in previously unused places may reduce costs and increase overall user satisfaction.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, in which other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
a processor; and
a memory in communication with the processor, the memory comprising program code executable by the processor to cause the processor to:
   display a graphical user interface (GUI) via a touch-screen display, the GUI comprising a first virtual object;
   determine that a contact with the touch-screen display corresponds to a location of the first virtual object;
   determine that a pressure of the contact with the touch-screen display exceeds a pressure threshold;
   based on determining that the contact corresponds to the location of the first virtual object and the pressure of the contact exceeds the pressure threshold, display a second virtual object within the GUI, the second virtual object being different from the first virtual object;
   based on displaying the second virtual object within the GUI, determine a haptic effect configured to (i) simulate a visual feature of the second virtual object, or (ii) indicate content in the second virtual object;
   generate a haptic signal based at least in part on the haptic effect; and
   transmit the haptic signal; and
a haptic output device in communication with the processor, the haptic output device configured to receive the haptic signal and output the haptic effect.

2. The system of claim 1, wherein the memory further comprises program code that is executable by the processor to cause the processor to select a pressure level from a plurality of pressure levels based on the pressure of the contact, wherein each pressure level of the plurality of pressure levels is associated with a different haptic effect configured to simulate a different visual feature of a virtual object.

3. The system of claim 1, wherein determining the haptic effect comprises determining no haptic effect.

4. The system of claim 1, wherein the visual feature comprises a first visual feature, and wherein the memory further includes program code executable by the processor to cause the processor to modify a second visual feature of the second virtual object based on the contact.

5. The system of claim 1, wherein the memory further includes program code executable by the processor to cause the processor to:
   select a function from among a plurality of functions based on the pressure of the contact and a virtual object, wherein at least one function of the plurality of functions is configured to manipulate the virtual object within a video game environment; and
   execute the function.

6. The system of claim 1, wherein the pressure threshold is a first pressure threshold, and wherein the memory further includes program code executable by the processor to cause the processor to:
   select a first function that comprises outputting a first data set in response to the pressure of the contact exceeding the first pressure threshold; and
   select a second function that comprises outputting a second data set that is different from the first data set in response to the pressure of the contact exceeding a second pressure threshold that is higher than the first pressure threshold.

7. The system of claim 1, wherein the haptic effect is configured to simulate the visual feature of the second virtual object, and wherein the visual feature includes a surface of the second virtual object.

8. A method, comprising:
   displaying, by a processor, a graphical user interface (GUI) via a touch-screen display, the GUI comprising a first virtual object;
   determining that a contact with the touch-screen display corresponds to a location of the first virtual object;
   determining, by the processor, that a pressure of the contact with the touch-screen display exceeds a pressure threshold;
   based on determining that the contact corresponds to the location of the first virtual object and the pressure of the contact exceeds the pressure threshold, displaying, by the processor, a second virtual object within the GUI via the touch-screen display, the second virtual object being different from the first virtual object;
   based on displaying the second virtual object within the GUI, determining, by the processor, a haptic effect configured to (i) simulate a visual feature of the second virtual object, or (ii) indicate content in the second virtual object; and
   causing, by the processor, a haptic output device to output the haptic effect.

9. The method of claim 8, wherein further comprising selecting a pressure level from a plurality of pressure levels based on the pressure of the contact, wherein each pressure level of the plurality of pressure levels is associated with a different haptic effect configured to simulate a different virtual feature of a virtual object.

10. The method of claim 8, wherein determining the haptic effect comprises determining no haptic effect.

11. The method of claim 8, wherein the visual feature comprises a first visual feature, and further comprising modifying a second visual feature of the second virtual object based on the contact.

12. The method of claim 8, further comprising:
   selecting a function from among a plurality of functions based on the pressure of the contact and a virtual object, wherein at least one function of the plurality of functions is configured to manipulate the virtual object within a video game environment; and
   executing the function.

13. The method of claim 8, wherein the pressure threshold is a first pressure threshold, and further comprising:
   selecting a first function that comprises outputting a first data set in response to the pressure of the contact exceeding the first pressure threshold; and
   selecting a second function that comprises outputting a second data set that is different from the first data set in response to the pressure of the contact exceeding a second pressure threshold that is higher than the first pressure threshold.

14. The method of claim 8, wherein the haptic effect is configured to simulate operation of the second virtual object.

15. A non-transitory computer readable medium comprising program code, which when executed by a processor is configured to cause the processor to:
- display a graphical user interface (GUI) via a touch-screen display, the GUI comprising a first virtual object;
- determine that a contact with the touch-screen display corresponds to a location of the first virtual object;
- determine that a pressure of the contact with the touch-screen display exceeds a pressure threshold;
- based on determining that the contact corresponds to the location of the first virtual object and the pressure of the contact exceeds the pressure threshold, display a second virtual object within the GUI, the second virtual object being different from the first virtual object;
- based on displaying the second virtual object within the GUI, determine a haptic effect configured to (i) simulate a visual feature of the second virtual object, or (ii) indicate content in the second virtual object;
- generate a haptic signal based at least in part on the haptic effect; and
- transmit the haptic signal to a haptic output device, wherein the haptic output device is configured to receive the haptic signal and output the haptic effect.

16. The non-transitory computer readable medium of claim 15, further comprising program code that is executable by the processor to cause the processor to select a pressure level from a plurality of pressure levels based on the pressure of the contact, wherein each pressure level of the plurality of pressure levels is associated with a different haptic effect configured to simulate a different virtual feature of a virtual object.

17. The non-transitory computer readable medium of claim 15, wherein the haptic effect is configured to indicate the content in the second virtual object.

18. The non-transitory computer readable medium of claim 15, wherein the visual feature comprises a first visual feature, and further comprising program code executable by the processor to cause the processor to modify a second virtual visual feature of the second virtual object based on the contact.

19. The non-transitory computer readable medium of claim 15, further comprising program code executable by the processor to cause the processor to:
- select a function from among a plurality of functions based on the pressure of the contact and a virtual object, wherein each function of the plurality of functions is configured to manipulate the virtual object within a video game environment in a different manner; and
- execute the function.

20. The non-transitory computer readable medium of claim 15, wherein the pressure threshold is a first pressure threshold, and further comprising program code executable by the processor to cause the processor to:
- select a first function that comprises outputting a first data set in response to the pressure of the contact exceeding the first pressure threshold; and
- select a second function that comprises outputting a second data set that is different from the first data set in response to the pressure of the contact exceeding a second pressure threshold that is higher than the first pressure threshold.

* * * * *